US 8,803,743 B2

(12) United States Patent
Nekozuka

(10) Patent No.: US 8,803,743 B2
(45) Date of Patent: Aug. 12, 2014

(54) PORTABLE ELECTRONIC DEVICE

(75) Inventor: Hikaru Nekozuka, Yokohama (JP)

(73) Assignee: Kyocera Corporation, Kyoto (JP)

( * ) Notice: Subject to any disclaimer, the term of this patent is extended or adjusted under 35 U.S.C. 154(b) by 503 days.

(21) Appl. No.: 13/131,493

(22) PCT Filed: Nov. 26, 2009

(86) PCT No.: PCT/JP2009/006394
§ 371 (c)(1),
(2), (4) Date: Jul. 25, 2011

(87) PCT Pub. No.: WO2010/061608
PCT Pub. Date: Jun. 3, 2010

(65) Prior Publication Data
US 2012/0001808 A1    Jan. 5, 2012

(30) Foreign Application Priority Data

Nov. 26, 2008  (JP) ................................. 2008-301177

(51) Int. Cl.
*H01Q 1/24* (2006.01)
(52) U.S. Cl.
USPC ........... 343/702; 343/725; 343/878; 455/572; 455/575.7
(58) Field of Classification Search
USPC ................ 343/702, 725, 878; 455/572, 575.7
See application file for complete search history.

(56) References Cited

U.S. PATENT DOCUMENTS

| | | | |
|---|---|---|---|
| 7,830,313 B2 | 11/2010 | Isoda et al. | |
| 2002/0068602 A1* | 6/2002 | Kuriyama et al. | ............ 455/550 |
| 2003/0137459 A1* | 7/2003 | Kim et al. | ...................... 343/702 |
| 2006/0071863 A1 | 4/2006 | Lindell | |
| 2008/0100514 A1* | 5/2008 | Abdul-Gaffoor et al. | ..... 343/702 |
| 2009/0111531 A1* | 4/2009 | Cui et al. | ...................... 455/572 |
| 2010/0052997 A1* | 3/2010 | Kan et al. | ...................... 343/702 |

FOREIGN PATENT DOCUMENTS

| | | |
|---|---|---|
| CN | 1714469 A | 11/2003 |
| CN | 101010929 A | 8/2007 |
| JP | 2005-217917 A | 8/2005 |
| JP | 2007-6029 A | 1/2007 |
| JP | 2007-194864 A | 8/2007 |
| JP | 2007-336480 A | 12/2007 |
| JP | 2008-22469 A | 1/2008 |
| JP | 2009-232362 A | 10/2009 |

OTHER PUBLICATIONS

International Search Report for PCT/JP2009/006394, mailed Mar. 2, 2010.

(Continued)

*Primary Examiner* — Allyson Trail
(74) *Attorney, Agent, or Firm* — Hoffmann & Baron, LLP

(57) ABSTRACT

A portable electronic device which can be changed between a first state and a second state includes an antenna that forms a loop in the first state and does not form the loop in the second state. A mobile telephone includes an operation unit-side casing, a display unit-side casing, a linking part which links the operation unit-side casing and the display unit-side casing; and a loop antenna. The loop antenna includes a first part disposed at the operation unit-side casing; a second part disposed at the display unit-side casing; a contacting part disposed at the operation unit-side casing; and a contacted part disposed at the display unit-side casing.

10 Claims, 17 Drawing Sheets

(56) References Cited

OTHER PUBLICATIONS

Notice of Reasons for Rejection issued to CN Application No. 200980146793.5, mailed Mar. 28, 2013.

Office Action, issued to CN Application No. 200980146793.5, mailed Oct. 30, 2013.

Notice of Reasons for Rejection issued to CN Application No. 200980146793.5, mailed May 16, 2014.

* cited by examiner ate # PORTABLE ELECTRONIC DEVICE

CROSS REFERENCE TO RELATED APPLICATIONS

This application is the National Stage of International Application No. PCT/JP2009/006394, filed Nov. 26, 2009, which claims the benefit of Japanese Application No. 2008-301177, filed Nov. 26, 2008, the entire contents of all of which are incorporated by reference herein.

FIELD OF THE INVENTION

The present invention relates to a portable electronic device such as a cellular telephone device.

BACKGROUND OF THE INVENTION

In recent years, some cellular telephone devices as portable electronic devices include a function similar to a contactless IC card.

For example, there has been proposed a cellular telephone device including a loop antenna, in which information is read and written by inductive coupling of an external device and the loop antenna (for example, see Patent Document 1).

Patent Document 1: Japanese Unexamined Patent Application, Publication No. 2007-336480

SUMMARY OF THE INVENTION

Problems to be Solved by the Invention

The present invention provides a portable electronic device including a loop antenna, in which information is read and written by inductive coupling of an external device and the loop antenna, bodies in relative positions are transformable into a first state and a second state, and each state is associated with using or not using the loop antenna.

Means for Solving the Problems

The present invention relates to a portable electronic device including: a first body; a second body; a connecting portion that connects the first body and the second body, of which relative positions can be changed, so as to be transformable into a first state and a second state; and an antenna that is disposed in the first body and the second body, in which the antenna includes: a first portion, at least a part of which is disposed on a side of the first body; a second portion, at least a part of which is disposed on a side of the second body; a contacting portion that is disposed on a side of the first portion; and a contacted portion that is disposed on a side of the second portion, in which the antenna forms a loop by way of the contacting portion and the contacted portion being connected in the first state, and the antenna does not form a loop by way of the contacting portion and the contacted portion being separated in the second state.

The present invention relates to a portable electronic device including: a first body including a first face; a second body including a second face; a connecting portion that connects the first body and the second body so as to be openable and closable around an opening-and-closing axis, and transformable into an opened state in which the first face and the second face are disposed to be separated from each other, and a closed state in which the first face and the second face are disposed to be superimposed in a state of being adjacent to each other; and an antenna that is disposed in the first body and the second body, in which the antenna includes: a first portion, at least a part of which is disposed on a side of the first body; a second portion, at least a part of which is disposed on a side of the second body; a contacting portion that is disposed on a side of the first portion; and a contacted portion that is disposed on a side of the second portion, in which the antenna forms a loop by way of the contacting portion and the contacted portion being connected in the opened state, and the antenna does not form a loop by way of the contacting portion and the contacted portion being separated in the closed state.

The present invention relates to a portable electronic device including: a first body including a first face; a second body that is disposed so as to be superimposed on a side of the first face of the first body; a connecting portion that connects the first body and the second body so as to be slidably moved and to be transformable into an opened state in which a predetermined area of the first face is externally exposed, and a closed state in which the predetermined area is covered; and an antenna that is disposed in the first body and the second body, in which the antenna includes: a first portion, at least a part of which is disposed on a side of the first body; a second portion, at least a part of which is disposed on a side of the second body; a contacting portion that is disposed on a side of the first portion; and a contacted portion that is disposed on a side of the second portion, in which the antenna forms a loop by way of the contacting portion and the contacted portion being connected in one of the opened state or the closed state, and the antenna does not form a loop by way of the contacting portion and the contacted portion being separated in another one of the opened state or the closed state.

The present invention relates to a portable electronic device including: a first body including a first face; a second body that is disposed so as to be superimposed on a side of the first face of the first body; a connecting portion that includes a rotational axis extending in a direction intersecting the first face of the first body, and connects the first body and the second body so as to be relatively rotatable around the rotational axis and transformable into a first state and a second state; and an antenna that is disposed in the first body and the second body, in which the antenna includes: a first portion, at least a part of which is disposed on a side of the first body; a second portion, at least a part of which is disposed on a side of the second body; a contacting portion that is disposed on a side of the first portion; and a contacted portion that is disposed on a side of the second portion, in which the antenna forms a loop by way of the contacting portion and the contacted portion being connected in one of the first state or the second state, and the antenna does not form a loop by way of the contacting portion and the contacted portion being separated in another one of the first state or the second state.

EFFECTS OF THE INVENTION

According to the present invention, it is possible to provide a portable electronic device that is transformable into a first state and a second state, and includes an antenna that forms a loop in the first state and does not form a loop in the second state.

Figure 1:
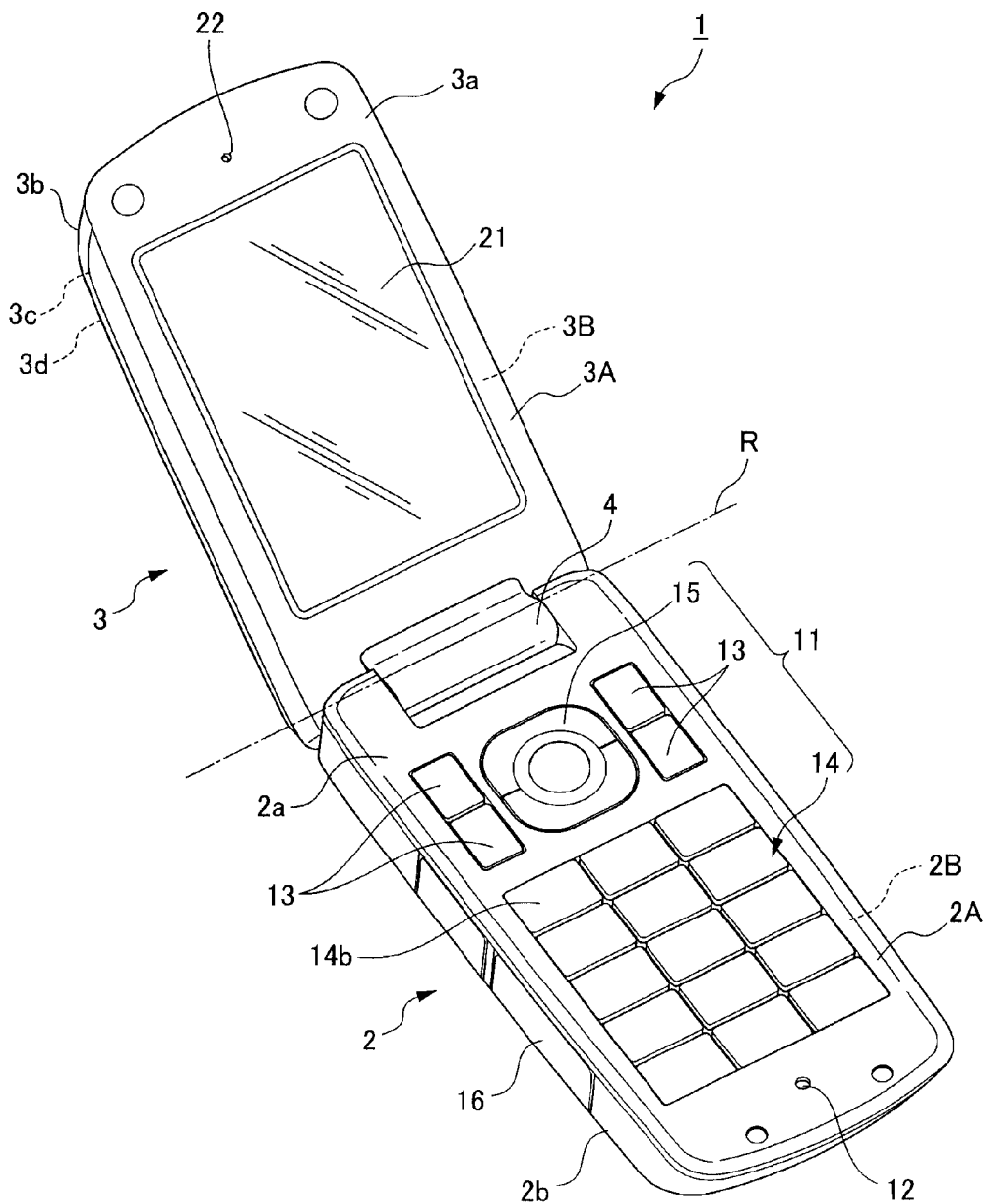
FIG. 1 shows a perspective view showing an appearance of a cellular telephone device 1 in an opened state.

EXPLANATION OF REFERENCE NUMERALS 1 cellular telephone device
2 operation unit side body
2A operation unit side inner face
3 display unit side body
3A display unit side inner face
4 connecting portion
100 loop antenna
100a first portion
100b second portion
100d first extension portion
100e second extension portion
102 sheet portion
104 coil portion
150 contact point
150a contacting portion
150b contacted portion
S opening-and-closing axis
R rotational axis
Z rotational axis

DETAILED DESCRIPTION OF THE INVENTION

A preferred embodiment for carrying out the present invention is hereinafter described with reference to the drawings.

First, a basic structure of a cellular telephone device 1 is described with reference to FIG. 1. FIG. 1 shows a perspective view showing an appearance of the cellular telephone device 1 in an opened state.

As shown in FIG. 1, the cellular telephone device 1 as a portable electronic device includes: an operation unit side body 2 as a first body; and a display unit side body 3 as a second body. The operation unit side body 2 includes: an operation unit side inner face 2A as a first face; and an operation unit side outer face 2B as a third face that is opposite to the operation unit side inner face 2A. The display unit side body 3 includes: a display unit side inner face 3A as a second face; and a display unit side outer face 3B as a fourth face that is opposite to the display unit side inner face 3A.

The operation unit side body 2 and the display unit side body 3 are connected via a connecting portion 4 including a hinge mechanism. More specifically, an upper end portion of the operation unit side body 2 and a lower end portion of the display unit side body 3 are connected via the connecting portion 4.

The connecting portion 4 connects the operation unit side body 2 and the display unit side body 3 so as to be openable and closable around the opening-and-closing axis R, such that the operation unit side body 2 and the display unit side body 3 are transformable into: an opened state in which the display unit side body 3 is disposed in a closed position as a first relative position with regard to the operation unit side body 2, and the operation unit side inner face 2A and display unit side inner face 3A are disposed so as to be separated from each other; and a closed state in which the display unit side body 3 is disposed in an opened position as a second relative position with regard to the operation unit side body 2, and the operation unit side inner face 2A and display unit side inner face 3A are disposed so as to be superimposed in a state of being adjacent to each other.

As a result, the cellular telephone device 1 is configured such that the operation unit side body 2 and the display unit side body 3 connected via the connecting portion 4 can be relatively moved. In other words, the cellular telephone device 1 can be switched (transformed) between a state in which the operation unit side body 2 and the display unit side body 3 are opened (the opened state), and a state in which the operation unit side body 2 and the display unit side body 3 are folded (the closed state). Here, in terms of the bodies, the closed state refers to a state in which both bodies are disposed so as to be mutually superimposed, and the opened state refers to a state in which both bodies are disposed so as not to be mutually superimposed.

An outer face of the operation unit side body 2 is configured with a front case 2a and a rear case 2b. The operation unit side body 2 is configured to expose, on the front case 2a side (the operation unit side inner face 2A side), an operation key set 11 and a microphone 12 as a microphone to which sound produced by a user of the cellular telephone device 1 during a phone call is input.

The operation key set 11 is configured with: function setting operation keys 13 for operating various functions such as for various settings, a telephone number directory function and a mail function; input operation keys 14 for inputting the digits of a telephone number, characters for mail, and the like; and a selection operation key 15 for performing selection of the various operations, scrolling up, down, left and right, etc. Predetermined functions are assigned (key assignment) to each key configuring the operation key set 11 in accordance with the opened/closed state of the operation unit side body 2 and the display unit side body 3, various modes, and the type of application that is running. An operation corresponding to a function assigned to each key is executed by the user depressing each key.

The microphone 12 is disposed to an outer end side that is opposite to the connecting portion 4 side in a longitudinal direction of the operation unit side body 2. In other words, the microphone 12 is disposed to one outer end side of the cellular telephone device 1 in the opened state.

An interface (not illustrated) for communicating with an external device (for example, a host device) is disposed on one side face of the operation unit side body 2. Side keys, to which predetermined functions are assigned, and an interface (not illustrated) where external memory is inserted and removed are disposed on another side face of the operation unit side body 2. Each interface is covered with a cap. When not in use, each interface is covered with a cap.

An outer face of the display unit side body 3 is configured with a front panel 3a, a front case 3b, a rear case 3c, and a rear panel 3d. In the display unit side body 3, a display unit 21 for displaying a variety of information on the display unit side inner face 3A, and a speaker 22 as a receiver for outputting sound of the other party of a phone call are disposed so as to be exposed to the outside.

The display unit 21 is configured with a liquid crystal display panel, a drive circuit that drives the liquid crystal display panel, and a light source unit such as a backlight that irradiates light from the back face side of the liquid crystal display panel.

Next, internal structures of the operation unit side body 2 and the display unit side body 3 are described with reference to FIGS. 2 to 6.

Figure 2:
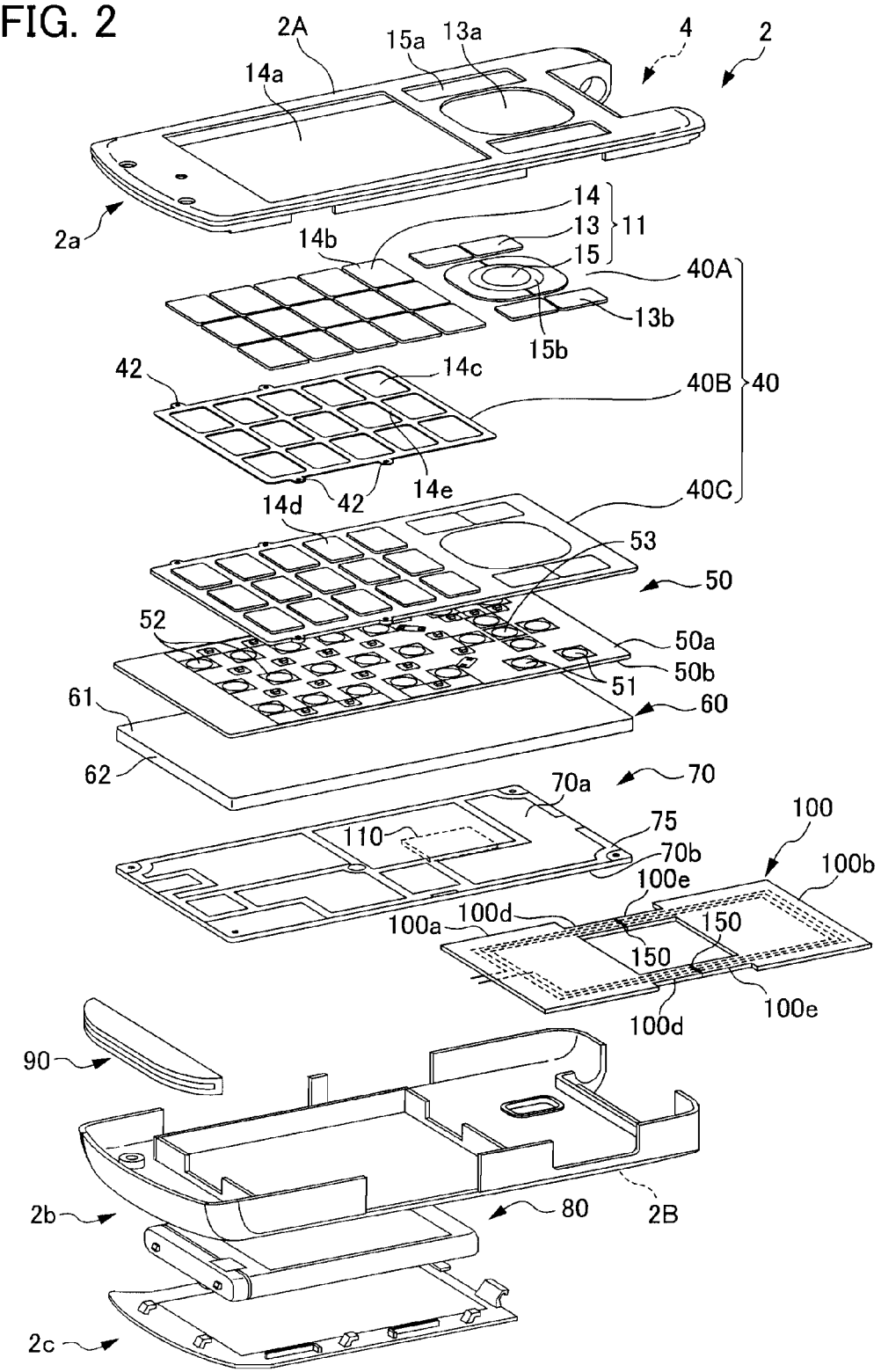
FIG. 2 is an exploded perspective view of members built into an operation unit side body 2.
Figure 3:
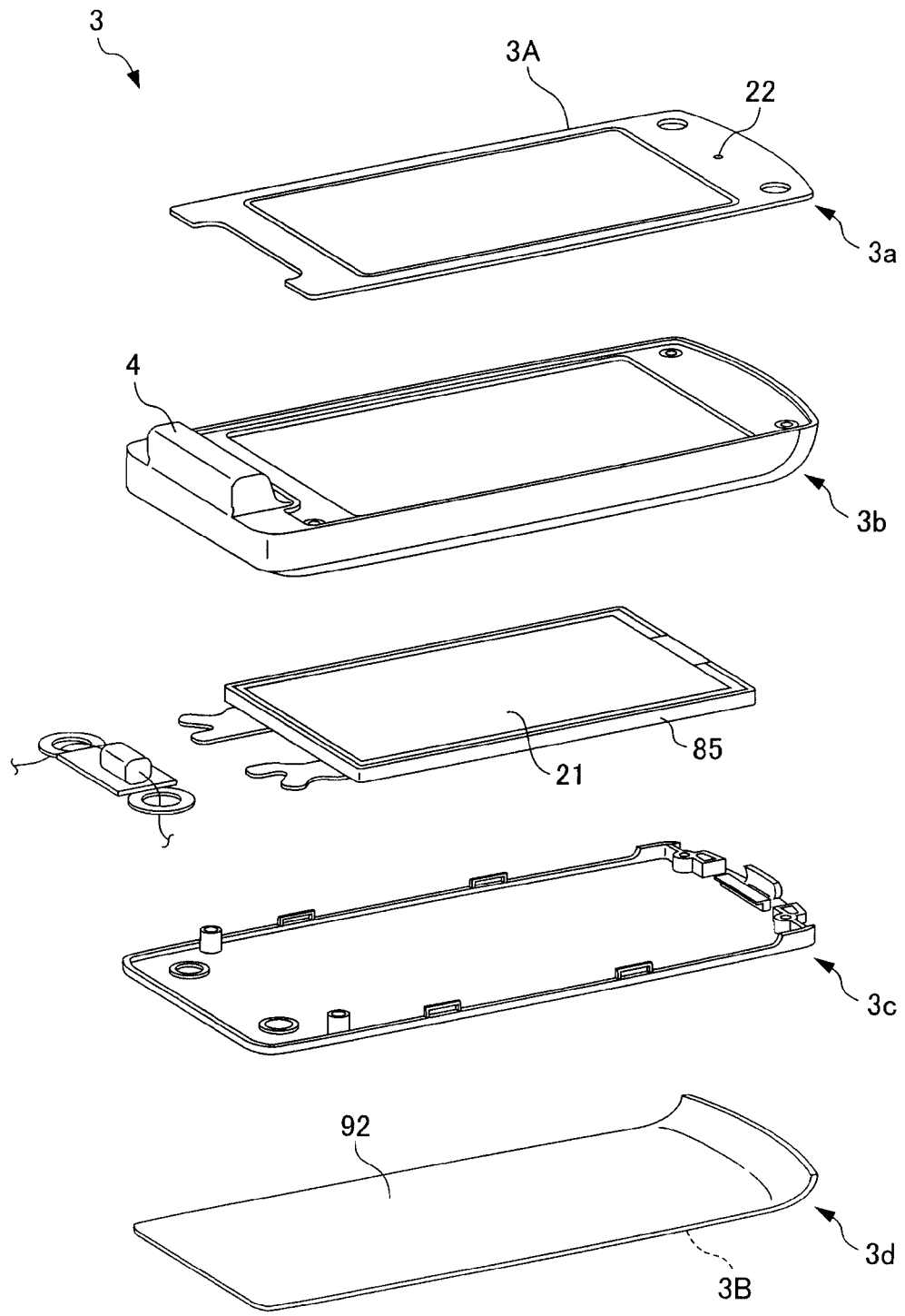
FIG. 3 is an exploded perspective view of members built into a display unit side body 3.
Figure 4:
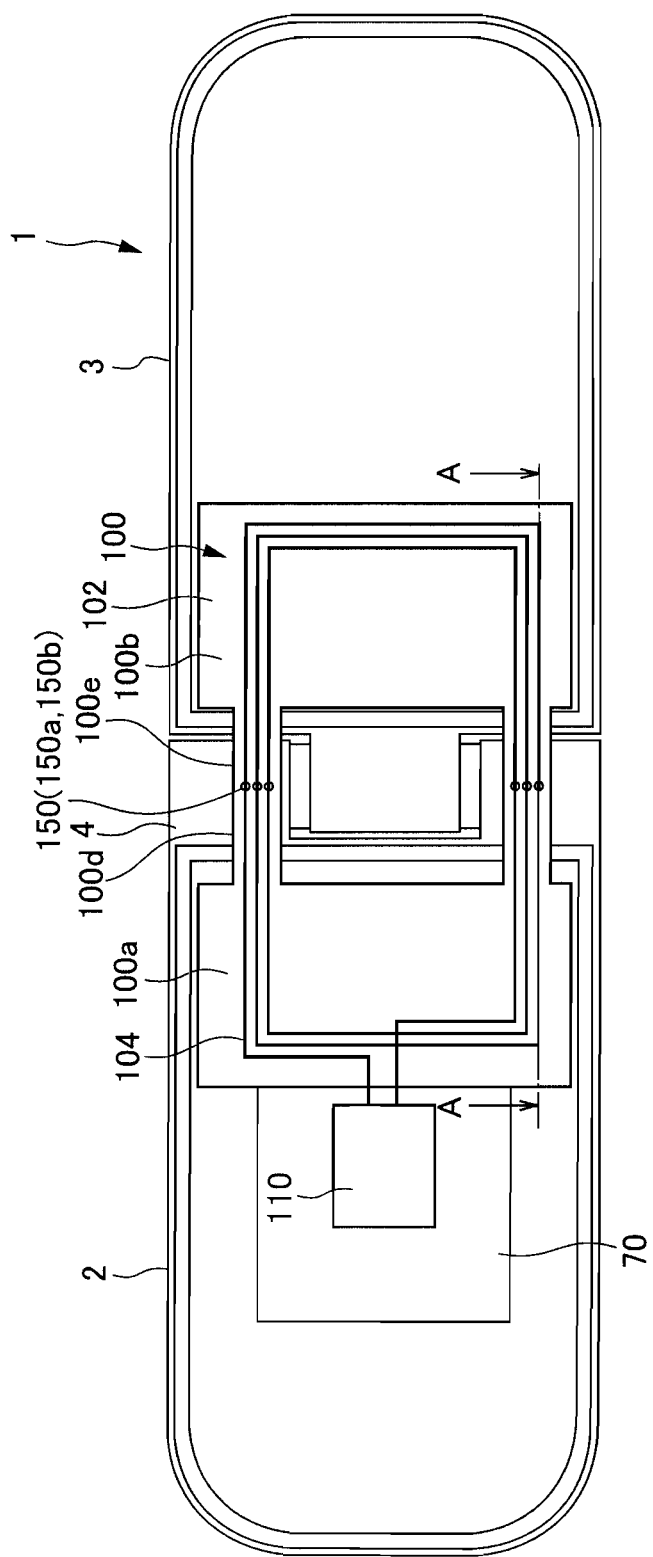
FIG. 4 is a plan view illustrating a loop antenna 100 in a case in which the cellular telephone device 1 is in the opened state.
Figure 5:
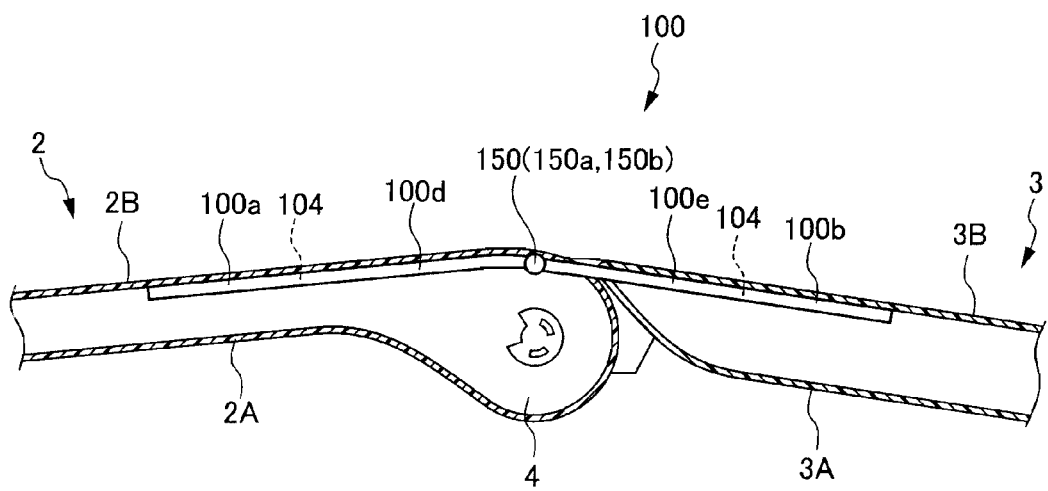
FIG. 5 is a cross-sectional view along a line A-A illustrating the loop antenna 100 in a case in which the cellular telephone device 1 is in the opened state.
Figure 6:
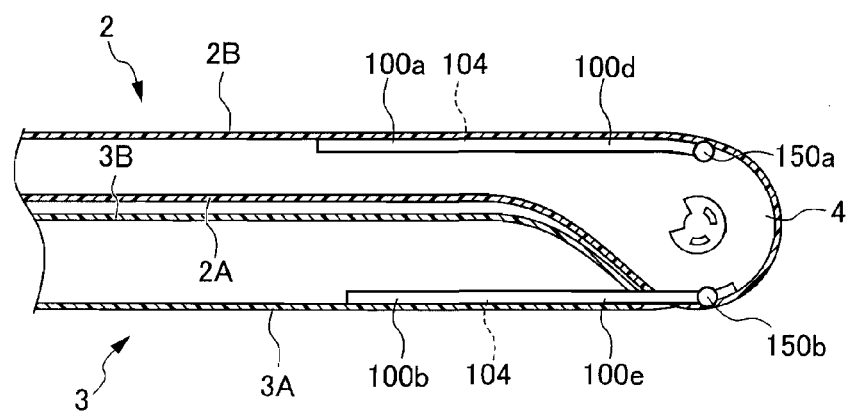
FIG. 6 is a cross-sectional view along the line A-A illustrating the loop antenna 100 in a case in which the cellular telephone device 1 is in the closed state.

FIG. 2 is an exploded perspective view of members built into the operation unit side body 2. FIG. 3 is an exploded perspective view of members built into the display unit side body 3. FIG. 4 is a plan view illustrating a loop antenna 100 in a case in which the cellular telephone device 1 is in the opened state. FIG. 5 is a cross-sectional view along a line A-A illustrating the loop antenna 100 in a case in which the cellular telephone device 1 is in the opened state. FIG. 6 is a cross-sectional view along the line A-A illustrating the loop antenna 100 in a case in which the cellular telephone device 1 is in the closed state.

As shown in FIG. 2, the operation unit side body 2 includes: the front case 2a; a key structure unit 40; a key substrate 50; a case body 60; a circuit board 70 including various electronic components such a reference potential patterned layer 75 and an RF (Radio Frequency) module for a cellular telephone device; a main antenna unit 90 for radio communication via an external base station; the loop antenna 100 that forms a loop in the opened state; the rear case 2b including a battery lid 2c; and a battery 80.

The front case 2a and the rear case 2b are disposed such that concave inner surfaces thereof face each other, and are connected such that peripheries thereof are superimposed with each other. Moreover, the key structure unit 40, the key substrate 50, the case body 60, the circuit board 70, the main antenna unit 90 and the loop antenna 100 are built therein so as to be interposed between the front case 2a and the rear case 2b.

Key holes 13a, 14a and 15a are formed in the inner face (the operation unit side inner face 2A) of the front case 2a, which faces the display unit 21 of the display unit side body 3 in the closed state in which the cellular telephone device 1 is folded. Each depression face of function setting operation key members 13b that configure the function setting operation keys 13, each depression face of input operation key members 14b that configure the input operation keys 14, and a depression face of a selection operation key member 15b that configures the selection operation key 15 are exposed from the key holes 13a, 14a and 15a, respectively. By pushing so as to depress each depression face of the function setting operation key members 13b, the input operation key members 14b, and the selection key member 15b, which are thus exposed, an apex of a metal dome (shaped like a bowl) (to be described later) provided in each of key switches 51, 52 and 53 is depressed, thereby contacting a switch terminal to establish electrical connection.

The key structure unit 40 is configured with operation members 40A, a key frame 40B as a reinforcing member, and a key sheet 40C as a sheet member.

The operation members 40A are configured with a plurality of key operation members. More specifically, the operation members 40A are configured with the function setting operation key members 13b, the input operation key members 14b and the selection operation key member 15b. Each operation key member that configures the operation members 40A is adhered to the key sheet 40C by interposing the key frame 40B (to be described later) therebetween. The depression faces of the operation key members adhered to the key sheet 40C are disposed so as to be exposed from the key holes 13a, 14a and 15a to the outside, respectively, as described above.

The key frame 40B is a metallic plate-like member with a plurality of holes 14c formed therein. The key frame 40B is a reinforcing member for preventing an adverse effect on the circuit board 70 and the like due to depression of the input operation key members 14b. Moreover, the key frame 40B is an electrically conductive member, and also functions as a member for dissipating static electricity of the input operation key members 14b. Convex portions 14d formed on the key sheet 40C (to be described later) are disposed to fit in the plurality of holes 14c formed in the key frame 40B. In addition, the input operation key members 14b are adhered to the convex portions 14d.

The key sheet 40C is a sheet member made of flexible silicon rubber. The plurality of convex portions 14d are formed on the key sheet 40C as described above. The plurality of convex portions 14d are formed on a side on which the key frame 40B is disposed on the key sheet 40C. The plurality of convex portions 14d are formed in positions corresponding to the key switches 52 (to be described later), respectively.

The key substrate 50 has the plurality of key switches 51, 52 and 53 disposed on a first face 50a that is a face on the key sheet 40C side. The plurality of key switches 51, 52 and 53 are disposed in positions corresponding to the operation members 40A, respectively. The key switches 51, 52 and 53 disposed on the key substrate 50 have a structure of a metal dome made of a metal plate that is three-dimensionally curved like a bowl. The metal dome is configured such that, when an apex of the bowl-shaped metal dome is depressed, contact is made with a switch terminal formed on an electric circuit (not illustrated) printed on the key substrate 50, thereby establishing an electrical connection. Moreover, a plurality of metal interconnections are formed on a second face 50b side of the key substrate 50.

As shown in FIG. 2, the case body 60 is an electrically conductive member having a shape in which one large face of a thin right-angled parallelepiped is opened. The case body 60 has a rib 62 that is formed substantially perpendicularly to a face of the opening side of a flat plate portion 61. The rib 62 is formed with a height as high as, or sufficiently higher than, the highest electronic component among the various electronic components mounted on the circuit board 70. The rib 62 is formed so as to correspond to the reference potential patterned layer 75 that configures a reference potential portion at the periphery and inside of the flat plate portion 61. More specifically, the rib 62 is formed so as to be disposed on the reference potential patterned layer 75 in a state where the case body 60 is placed on the circuit board 70. It should be noted that, instead of forming the case body 60 with metal, the case body 60 may be formed with a skeleton formed of resin, and a conductor film formed on a surface thereof.

By causing a bottom face of the rib to abut on the reference potential patterned layer 75, the case body 60 is electrically connected to the reference potential patterned layer 75. The case body 60 is electrically connected to the reference potential patterned layer 75, and thus has an electric potential that is as high as that of the reference potential patterned layer 75. In other words, the case body 60 functions as a shielding case. As a shielding case, the case body 60 suppresses influence of noise such as a high frequency wave from the outside on various electronic components disposed on the circuit board 70, and shields noise emitted from an RF (Radio Frequency) circuit, a CPU circuit, a power supply circuit and the like, thereby suppressing influence of such noise on other electronic components, a receiving circuit and the like connected to the main antenna unit 90. More specifically, the bottom face of the rib 62 in the case body 60 is disposed on the reference potential patterned layer 75, and as a result, each circuit (to be described later) is surrounded by the rib 62 and covered with a part of the flat plate portion 61. The rib 62 functions as a partition wall in each circuit, and each circuit is shielded by the rib 62 and a part of the flat plate portion 61.

As shown in FIG. 2, various electronic components and circuits (not illustrated) including a signal processing unit that processes a signal transmitted and received via the main antenna unit 90 are disposed on the circuit board 70. The various electronic components form a plurality of circuit blocks by way of predetermined combinations. For example, various circuit blocks including an RF (Radio Frequency) circuit, a power supply circuit and the like are formed.

In addition to the aforementioned various electronic components, the reference potential patterned layer 75 that configures a reference potential portion is formed on a first face 70*a* on the case body 60 side of the circuit board 70. The reference potential patterned layer 75 is formed so as to partition each circuit block described above. The reference potential patterned layer 75 is formed by printing an electrically conductive member in a predetermined pattern on the surface of the first face 70*a* of the circuit board 70. An RFID chip 110 that is connected to the loop antenna 100 is disposed on a second face 70*b* on the battery side of the circuit board 70. An external reading/writing device reads and writes information from and into the RFID chip 110 via the loop antenna 100.

The main antenna unit 90 is configured by disposing an antenna element of a predetermined shape on a base. The main antenna unit 90 is disposed on the end portion side that is opposite to the connecting portion 4 side in the cellular telephone device 1. The antenna element of the main antenna unit 90 is formed of a belt-shaped sheet metal. Moreover, the main antenna unit 90 is fed with power from the circuit board 70 via a feed terminal (not illustrated). As a result, the antenna element is fed with power from the circuit board 70 via the feed terminal, and is connected to the RF modules and the like on the circuit board 70.

As shown in FIGS. 4 to 6, the loop antenna 100 is disposed across the operation unit side body 2 and the display unit side body 3.

As shown in FIG. 4, the loop antenna 100 includes a sheet portion 102 and a coil portion 104 disposed on the sheet portion 102. As described later, the loop antenna 100 is configured so as to be transformable into a state of being separated (not forming a loop) and a state of being coupled (adjacent), in accordance with the state of the cellular telephone device 1.

The sheet portion 102 is a sheet-like member consisting of a PET (polyethylene terephthalate) material, and is a flexibly deformable member.

The coil portion 104 is formed by coiling a film-like conductive member.

The loop antenna 100 communicates with a reading/writing device (not illustrated) at a predetermined usable frequency band (for example, 13.56 Hz).

As shown in FIG. 4, the loop antenna 100 includes a first portion 100*a* and a second portion 100*b*, in which at least a part of the first portion 100*a* is disposed on the operation unit side body 2 side, and at least a part of the second portion 100*b* is disposed on the display unit side body 3 side.

As shown in FIGS. 5 and 6, the first portion 100*a* is disposed on the operation unit side outer face 2B side of the operation unit side body 2. The second portion 100*b* is disposed on the display unit side outer face 3B side of the display unit side body 3.

As shown in FIGS. 4 to 6, the first portion 100*a* includes first extension portions 100*d* and 100*d* that are disposed in the connecting portion 4 and extend to the second portion 100*b* side. Moreover, the second portion 100*b* includes second extension portions 100*e* and 100*e* that are disposed in the connecting portion 4 and extend to the first portion 100*a* side.

The first extension portions 100*d* and the second extension portions 100*e* are configured so as to be capable of being separated from and coupled with (being adjacent to) each other. More specifically, the first extension portions 100*d* and the second extension portions 100*e* are configured so as to be coupled with (be adjacent to) each other in a case in which the cellular telephone device 1 is in the opened state (see FIGS. 4 and 5), and to be separated from each other in a case in which the cellular telephone device 1 is in the closed state (see FIG. 6).

As shown in FIGS. 4 to 6, the coil portion 104 includes contact points 150 that are coupled in a case in which the first extension portions 100*d* and the second extension portions 100*e* are coupled with (adjacent to) each other, and are separated in a case in which the first extension portions 100*d* and the second extension portions 100*e* are separated from each other. More specifically, the coil portion 104 includes the contact points 150 that are coupled with each other in a case in which the cellular telephone device 1 is in the opened state (see FIGS. 4 and 5), and are separated from each other in a case in which the cellular telephone device 1 is in the closed state (see FIG. 6).

The contact points 150 have a contacting portion 150*a* disposed on the first portion 100*a* side, and a contacted portion 150*b* disposed on the second portion 100*b* side.

The contacting portion 150*a* and the contacted portion 150*b* are coupled (connected) in a case in which the first extension portions 100*d* and the second extension portions 100*e* are coupled with (adjacent to) each other, and are separated in a case in which the first extension portions 100*d* and the second extension portions 100*e* are separated from each other. More specifically, the contacting portion 150*a* and the contacted portion 150*b* are coupled (connected) with each other in a case in which the cellular telephone device 1 is in the opened state (see FIGS. 4 and 5), and are separated from each other in a case in which the cellular telephone device 1 is in the closed state (see FIG. 6).

As a result, the loop antenna 100 enters a state in which a loop is formed by way of the contacting portion 150*a* and contacted portion 150*b* being connected in the opened state, and enters a state in which a loop is not formed by way of the contacting portion 150*a* and contacted portion 150*b* being separated in the closed state.

As shown in FIGS. 4 and 5, the loop antenna 100 forms a loop in a case in which the cellular telephone device 1 is in the opened state. The loop antenna 100 forms a loop extending in a plane in a case in which the cellular telephone device 1 is in the opened state. The loop antenna 100 assumes an annular shape extending in a plane. In the state in which a loop is formed, the loop antenna 100 can receive a magnetic field, and can generate an electromotive force by way of electromagnetic induction. In other words, in the state in which a loop is formed, the loop antenna 100 can communicate with a reading/writing device disposed outside.

In addition, as shown in FIG. 6, in a case in which the cellular telephone device 1 is in the closed state, in accordance with the transformation of the cellular telephone device 1, the loop antenna 100 enters the state in which a loop is not formed by way of the first portions 100$a$ and second portions 100$b$ being separated. More specifically, in a case in which the cellular telephone device 1 is in the closed state, the contacting portion 150$a$ and contacted portion 105$b$ are separated from each other, and thus the coil portion 104 configuring the loop antenna 100 enters a state in which a loop is not formed.

In other words, in a case in which the cellular telephone device 1 is in the closed state, the loop antenna 100 cannot communicate with a reading/writing device disposed outside.

As shown in FIG. 2, a removable battery lid 2$c$ is provided on one end side of the rear case 2$b$ (in FIG. 2). The battery lid 2$c$ is mounted to the rear case 2$b$ after accommodating the battery 80 from the outside of the rear case 2$b$. Furthermore, the microphone 12 (not illustrated) for inputting sound of the user is accommodated in one end side of the rear case 2$b$.

As shown in FIG. 4, the display unit side body 3 includes: the front panel 3$a$; the front case 3$b$; the speaker 22; the display unit 21; a printed circuit board 85 to which the display unit 21 is connected; the rear case 3$c$; and the rear panel 3$d$.

The front panel 3$a$, the front case 3$b$, the display unit 21, the printed circuit board 85, the rear case 3$c$ and the rear panel 3$d$ are disposed so as to be superimposed in the display unit side body 3. More specifically, the front case 3$b$ and the rear case 3$c$ are disposed such that concave inner surfaces thereof face each other, and are connected such that peripheries thereof are superimposed with each other.

In addition, the printed circuit board 85 to which the display 21 is connected is built in and interposed between the front case 3$b$ and the rear case 3$c$. A speaker, to which an amplifier (not illustrated) is connected, is connected to the printed circuit board 85.

Subsequently, a circuit configuration of the cellular telephone device 1 is described with reference to FIG. 7.

Figure 7:
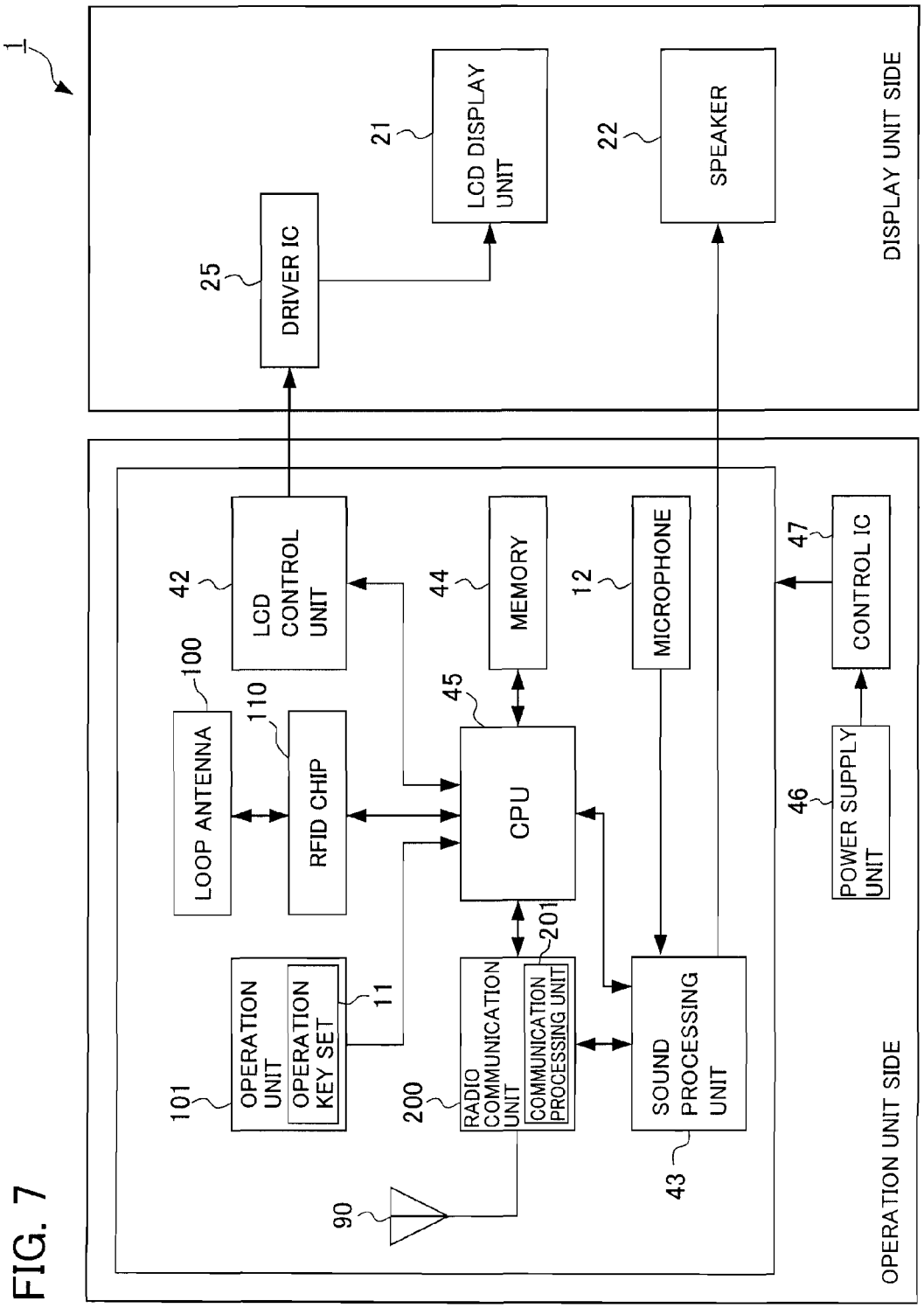
FIG. 7 is a block diagram illustrating a circuit configuration of the cellular telephone device 1.

FIG. 7 is a block diagram illustrating the circuit configuration of the cellular telephone device 1.

As shown in FIG. 7 the cellular telephone device 1 includes: a radio communication unit 200 disposed in the operation unit side body 2; an operation unit 101 as an input unit; the microphone 12; an LCD control unit 42; a sound processing unit 43; memory 44 as a storage unit; a CPU 45; a power supply unit 46; a control IC 47; the loop antenna 100; the RFID chip 110; the display unit 21 disposed in the display unit side body 3; the speaker 22; and a driver IC 25.

The radio communication unit 200 includes: the main antenna unit 90 that communicates with external devices at a predetermined usable frequency band; and a communication processing unit 201 that performs signal processing such as modulation processing or demodulation processing.

The main antenna unit 90 communicates with base stations (not illustrated) at a predetermined usable frequency band (for example, 800 MHz). The main antenna unit 90 communicates with external communication devices via the base stations at the predetermined usable frequency band. It should be noted that, although the predetermined usable frequency band is set to 800 MHz in the present embodiment, other frequency bands can also be used. Moreover, the main antenna unit 90 may be configured as a so-called dual band compatible antenna that can accept a second usable frequency band (for example, 2 GHz) in addition to the predetermined usable frequency band (a first usable frequency band), or as a multi-band compatible antenna that can further accept a third usable frequency band.

The communication processing unit 201 performs modulation processing on a signal transmitted from a predetermined function unit, and transmits the signal to base stations via the main antenna unit 90, and in addition, performs demodulation processing on a signal received via the main antenna unit 90, and transmits the signal to a predetermined function unit.

The operation unit 101 is configured by including the operation key set 11.

The LCD control unit 42 performs predetermined image processing on input image data in accordance with control by the CPU 45, and outputs the image data, on which the image processing has been performed, to the driver IC 25. The driver IC 25 stores the image data being input from the LCD control unit 42 in frame memory, and outputs the image data stored in the frame memory to the display unit 21 at predetermined timing.

The display unit 21 displays predetermined characters and images based on the data that is input from the driver IC 25.

The memory 44 stores predetermined data. More specifically, the memory 44 stores application programs that operate various functions, profile information, address information that is utilized for an address book function, and the like.

The CPU 45 controls the entirety of the cellular telephone device 1. The CPU 45 performs predetermined control of, in particular, the radio communication unit 200, the LCD control unit 42 and the sound processing unit 43.

In accordance with control by the CPU 45, the sound processing unit 43 performs predetermined sound processing on a signal transmitted from the communication processing unit 201, and outputs the signal on which the sound processing has been performed to the speaker 22. The speaker 22 outputs sound to the outside, based on a signal that is transmitted from the sound processing unit 43. Moreover, in accordance with control by the CPU 45, the sound processing unit 43 performs predetermined processing on a signal that is input from the microphone 12, and outputs the signal thus processed to the communication processing unit 201. The communication processing unit 201 performs predetermined processing on the signal that is input from the sound processing unit 43, and outputs the signal thus processed to the main antenna unit 90.

The power supply unit 46 is configured by including the battery 80. The battery 80 is a lithium-ion battery having predetermined capacity. The control IC 47 converts a power supply voltage, which is supplied from the power supply unit 46, into a predetermined power voltage, and supplies the power supply voltage thus converted to each unit (for example, the CPU 45 and the like) of the cellular telephone device 1.

The loop antenna 100, when approaching within a predetermined distance to a reading/writing device disposed outside, receives a magnetic field transmitted from the reading/writing device (modulated with respect to a carrier frequency (for example, 13.56 MHz)).

The RFID chip 110 includes: a power circuit that generates a predetermined voltage based on electrical power induced by a signal received via the loop antenna 100; an RF circuit that performs signal processing such as modulation processing or demodulation processing on a signal communicated via the loop antenna 100; a CPU that performs predetermined arithmetic processing; and memory that stores predetermined data.

The power circuit is configured with, for example, a DC-DC converter.

The power circuit generates a predetermined power supply voltage from an electromotive force that is produced by an electromagnetic induction effect of the loop antenna 100 having received a magnetic field, and supplies the power supply voltage to the RF circuit, the CPU and the memory. The RF circuit, the CPU and the memory transition from a halt state to an active state as a result of the predetermined power supply voltage being supplied from the power circuit.

The RF circuit performs signal processing such as demodulation on a signal received via the loop antenna 100, and transmits the signal thus processed to the CPU.

The RF circuit performs signal processing such as modulation on data that has been read from the memory, and transmits the data to an external reading/writing device via the loop antenna 100.

Based on such a signal transmitted from the RF circuit, the CPU writes or reads data to or from the memory. In a case of reading data from the memory, the CPU transmits the data to the RF circuit.

Here, in a case in which the cellular telephone device 1 is in the opened state (see FIGS. 4 and 5), the loop antenna 100 forms a loop, and thus the loop antenna 100 is in a state of being capable of communicating with a reading/writing device disposed outside, as described above. In other words, in the opened state, the cellular telephone device 1 is in a state of being capable of writing and reading data to and from the RFID chip 110.

Moreover, in a case in which the cellular telephone device 1 is in the closed state (see FIG. 6), the loop antenna 100 does not form a loop, and thus the loop antenna 100 is in a state of not being capable of communicating with a reading/writing device, as described above. In other words, in the closed state, the cellular telephone device 1 is in a state of not being capable of writing and reading data to and from the RFID chip 110.

In other words, the cellular telephone device 1 in the present embodiment can be switched between the state of being capable of communicating via the loop antenna 100 and the state of not being capable of communicating via the loop antenna 100, by changing its form (the opened state and the closed state). In the present embodiment, in the closed state where the communication function or the like is not utilized while the user is carrying the cellular telephone device 1, the cellular telephone device 1 is in the state of not being capable of communicating via the loop antenna 100.

According to the present embodiment, it is possible to provide the cellular telephone device 1 including the loop antenna 100 that forms a loop in a case in which the cellular telephone device 1 is in the opened state, and does not form a loop in a case in which the cellular telephone device 1 is in the closed state. According to the present embodiment, it is possible to provide the cellular telephone device 1, in which communication via the loop antenna 100 is possible in the opened state, and communication via the loop antenna 100 is not possible in the closed state.

In addition, according to the present embodiment, it is possible to switch between the state of being capable of communicating via the loop antenna 100 and the state of not being capable of communicating via the loop antenna 100, only by changing the opened state and the closed state of the cellular telephone device 1. As a result, the user can switch between the state of being capable of communicating via the loop antenna 100 and the state of not being capable of communicating via the loop antenna 100, by way of a simple operation. Furthermore, the state of being capable of communicating via the loop antenna 100 and the state of not being capable of communicating via the loop antenna 100 can be switched by way of a simple operation, a result of which suppresses failure to switch to the state of not being capable of communication for a conventional reason that a switching operation is complicated. As a result, unintentional writing and reading information to and from the RFID tip 110, which are not intended by the user, are suppressed. For example, this suppresses stealth withdrawal of electronic money charged therein.

Moreover, according to the present embodiment, the cellular telephone device 1 is not capable of communicating via the loop antenna 100 in the closed state that is an ordinary carrying state; therefore, unintentional reading and writing of information as described above can be preferably suppressed. In other words, the cellular telephone device 1 with improved security is provided.

Although the preferable embodiment has been described above, the present invention is not limited to the aforementioned embodiment, and can be implemented as various embodiments. For example, the cellular telephone device 1 is described as a portable electronic device in the present embodiment; however, the present invention is not limited thereto, and the portable electronic device may be a PHS (Personal Handyphone System), a PDA (Personal Digital Assistant), a portable navigation device, a notebook PC, or the like.

In addition, in the present embodiment, the loop antenna 100 includes the sheet portion 102 and the coil portion 104 disposed on the sheet portion 102 and formed by coiling a film-like conductive member; however, the loop antenna 100 is not limited thereto, and may be configured by including a coil portion on which a lead wire is wound.

Furthermore, in the present embodiment, the loop antenna 100 (the RFID chip 110) has been described as a passive induction field type (electromagnetic induction type) without a power supply unit; however, the loop antenna 100 is not limited thereto. The loop antenna 100 (the RFID chip 110) may be of, for example, a passive mutual induction type (electromagnetic coupling type) or a radiation electromagnetic field type (radio wave type). Moreover, the loop antenna 100 (the RFID chip 110) may be of, for example, an active type having a power supply unit.

In addition, an external device may be of a read/write type, a read-only type, a write-once type, etc.

Furthermore, the shape, structure and type of the contacting portion 150a and the contacted portion 150b are not particularly limited as long as the contact points 150 can be configured with such portions. The contacting portion 150a and the contacted portion 150b may be configured such that, for example, one of the portions includes a protrusion biased in its protruding direction, and may be configured to be securely connected when being adjacent to each other by way of a magnetic force.

Moreover, in the present embodiment, the cellular telephone device 1 is described as being foldable (openable and closable) via the connecting portion 4; however, the cellular telephone device 1 is not limited thereto. The cellular telephone device 1 may be configured so as to be transformable into the first state in which the display unit side body 3 is disposed in the first relative position with regard to the operation unit side body 2, and the second state in which the display unit side body 3 is disposed in the second relative position different from the first relative position with regard to the operation unit side body 2; and the cellular telephone device 1 may be of, for example: a so-called 2-axis hinge type that is openable, closable and rotatable; a slider type in which one body slides in one direction from a state in which the operation unit side body 2 and the display unit side body 3 are mutually superimposed; and a cycloid (rotation) type that is rotatable around a rotational axis line extending in the thickness direction of the display unit side body 3.

Descriptions are hereinafter provided for embodiments of the 2-axis hinge type, the slider type and the cycloid type.

First, a description is provided for an embodiment in which a cellular telephone device is of a 2-axis hinge type, with reference to FIGS. 8 to 11.

Figure 8:
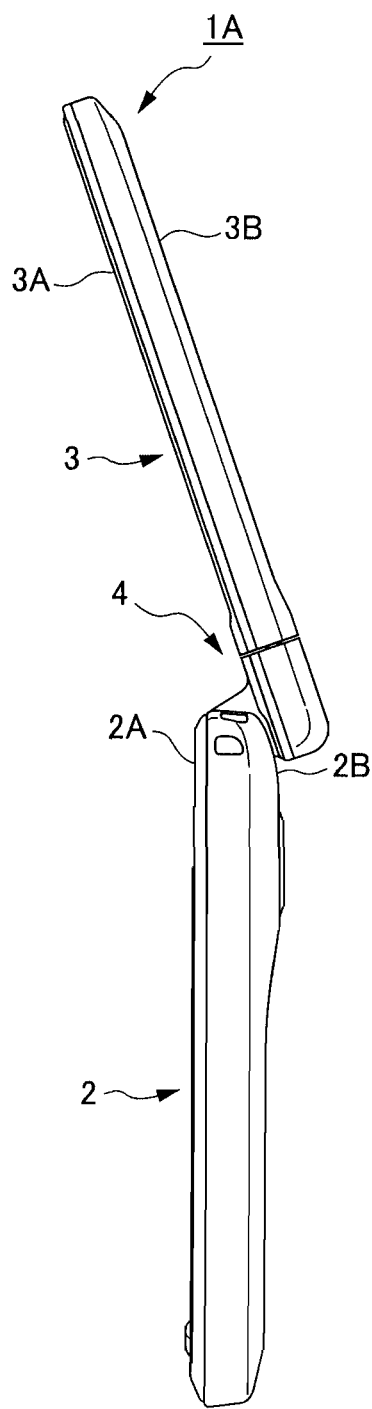
FIG. 8 is a side view of a cellular telephone device 1A in a first opened state.
Figure 9:
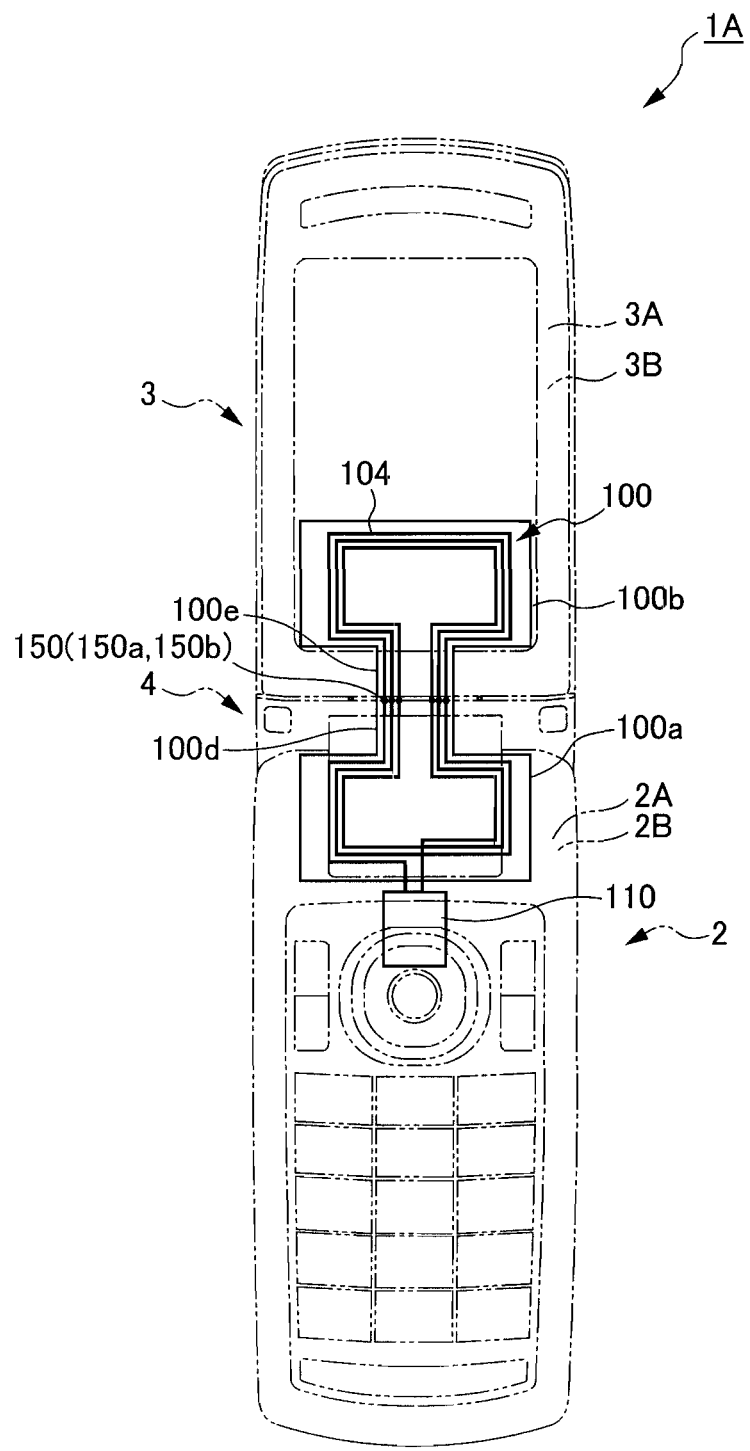
FIG. 9 is a diagram illustrating an arrangement and a state of the loop antenna 100 in the first opened state.
Figure 10:
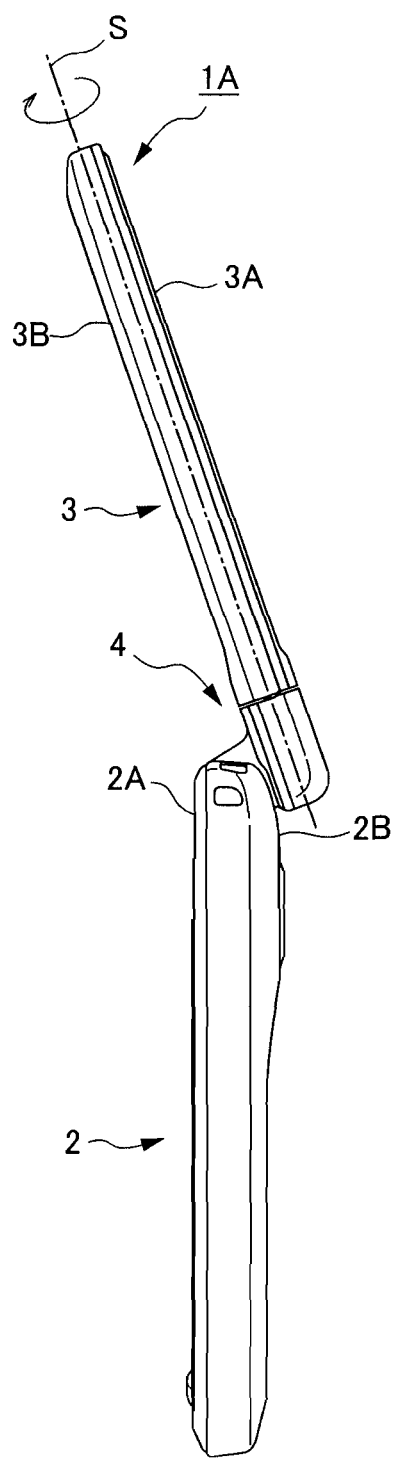
FIG. 10 is a side view of the cellular telephone device 1A in a second opened state.
Figure 11:
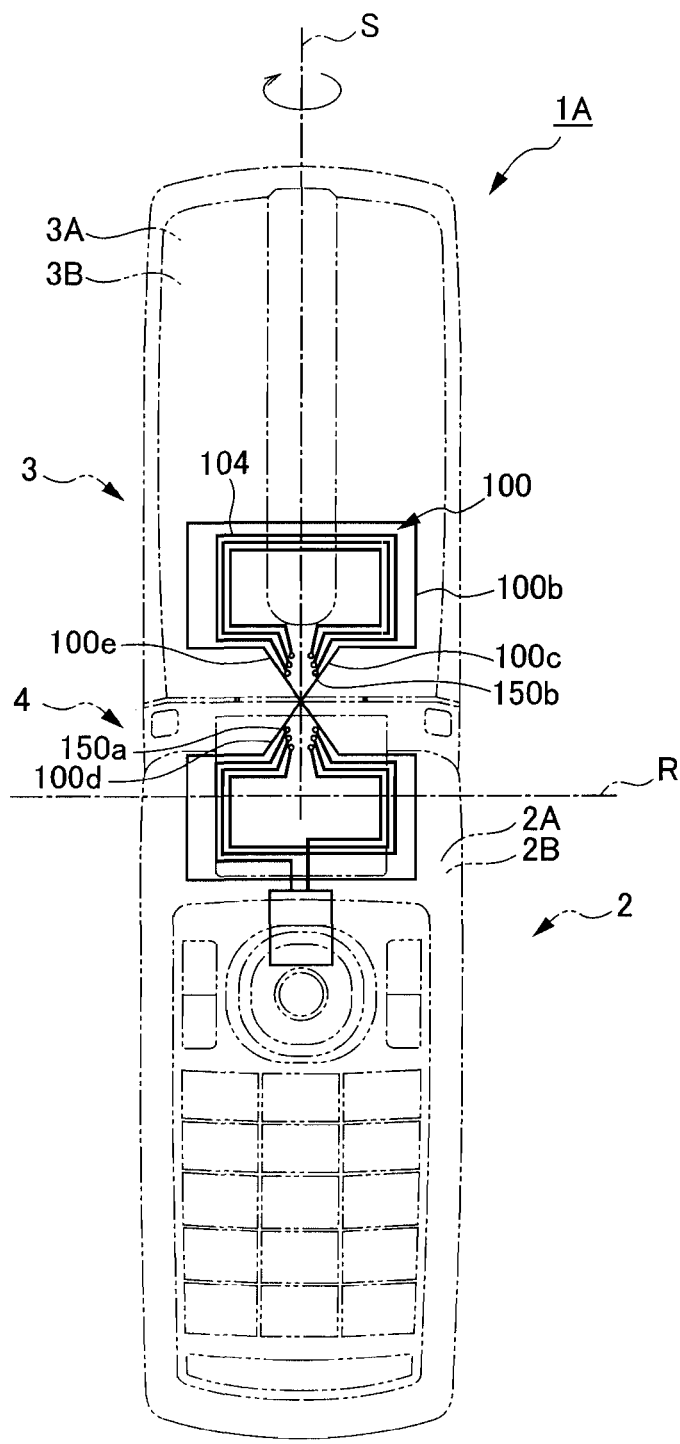
FIG. 11 is a diagram illustrating an arrangement and a state of the loop antenna 100 in the second opened state.

FIG. 8 is a side view of a cellular telephone device 1A in a first opened state. FIG. 9 is a diagram illustrating an arrangement and a state of the loop antenna 100 in the first opened state. FIG. 10 is a side view of the cellular telephone device 1A in a second opened state. FIG. 11 is a diagram illustrating an arrangement and a state of the loop antenna 100 in the second opened state. Here, the first opened state refers to an opened state in which the operation unit side inner face 2A and the display unit side inner face 3A are oriented to the same side (to the left side in FIG. 8). The second opened state refers to an opened state in which the operation unit side inner face 2A and the display unit side inner face 3A are oriented to different sides (to the left side and the right side in FIG. 10, respectively).

In the following, descriptions of configurations similar to those of the aforementioned cellular telephone device 1 (the opening-and-closing type) are omitted, and different configurations are mainly described.

As shown in FIGS. 8 to 11, the cellular telephone device 1A includes the operation unit side body 2 and the display unit side body 3. The operation unit side body 2 and the display unit side body 3 are connected via the connecting portion 4 including a 2-axis hinge mechanism. As a result, the cellular phone 1 A is transformable into the opened state and the closed state, and the display unit side body 3 can be switched between a front side state and a back side state in each of the opened state and the closed state.

Here, the closed state and the opened state are the same as those described for the aforementioned cellular telephone device 1 A.

Moreover, the cellular telephone device 1A in the opened state is transformable to switch the front and back of the display unit side body 3. The cellular telephone device 1A in the opened state is transformable from the first opened state in which the operation unit side inner face 2A and the display unit side inner face 3A are oriented to the same side (to the left side in FIG. 8) to the second opened state in which the operation unit side inner face 2A and the display unit side inner face 3A are oriented to different sides (to the left side and the right side in FIG. 10, respectively).

The connecting portion 4 connects the operation unit side body 2 and the display unit side body 3 so as to be openable and closable, and so as to be capable of reversing the front and back of the display unit side body 3 with regard to the operation unit side body 2.

In the opened state, the connecting portion 4 connects the operation unit side body 2 and the display unit side body 3 such that the display unit side body 3 is rotatable around a rotational axis S (see FIG. 11), which intersects an opening-and-closing axis R, with regard to the operation unit side body 2.

As shown in FIGS. 9 and 11, the loop antenna 100 includes the sheet portion 102 and the coil portion 104 disposed on the sheet portion 102. The loop antenna 100 includes the first portion 100a and the second portion 100b, in which at least a part of the first portion 100a is disposed on the operation unit side body 2 side, and at least a part of the second portion 100b is disposed on the display unit side body 3 side.

The first portion 100a includes the first extension portions 100d and 100d that are disposed in the connecting portion 4 and extend to the second portion 100b side. In addition, the second portion 100b includes the second extension portions 100e and 100e that are disposed in the connecting portion 4 and extend to the first portion 100a side.

The first extension portions 100d and the second extension portions 100e are configured so as to be capable of being separated from and coupled with (adjacent to) each other. More specifically, the first extension portions 100d and the second extension portions 100e are configured so as to be coupled with (adjacent to) each other in a case in which the cellular telephone device 1 A is in the opened state, and to be separated from each other in a case in which the cellular telephone device 1 A is in the closed state. Furthermore, the first extension portions 100d and the second extension portions 100e are configured so as to be coupled with (adjacent to) each other in a case in which the cellular telephone device 1 A is in the first opened state, and to be separated from each other in a case in which the cellular telephone device 1 A is in the second opened state.

The coil portion 104 includes the contact points 150 that are coupled (connected) in a case in which the first extension portions 100d and the second extension portions 100e are coupled (adjacent to) each other, and are separated in a case in which the first extension portions 100d and the second extension portions 100e are separated from each other. More specifically, the coil portion 104 includes the contact points 150 that are coupled (connected) with each other in a case in which the cellular telephone device 1 A is in the opened state, and are separated from each other in a case in which the cellular telephone device 1 A is in the closed state. Moreover, the coil portion 104 includes the contact points 150 that are coupled (connected) with each other in a case in which the cellular telephone device 1 A is in the first opened state, and are separated from each other in a case in which the cellular telephone device 1 A is in the second opened state.

The contact points 150 have the contacting portion 150a disposed on the first portion 100a side, and the contacted portion 150b disposed on the second portion 100b side. The contacting portion 150a and the contacted portion 150b are coupled (connected) in a case in which the first extension portions 100d and the second extension portions 100e are coupled with (adjacent to) each other, and are separated in a case in which the first extension portions 100d and the second extension portions 100e are separated from each other. More specifically, the contacting portion 150a and the contacted portion 150b are coupled (connected) with each other in a case in which the cellular telephone device 1 A is in the opened state, and are separated from each other in a case in which the cellular telephone device 1 A is in the closed state. In addition, the contacting portion 150a and the contacted portion 150b are coupled (connected) with each other in a case in which the cellular telephone device 1 A is in the first opened state, and are separated from each other in a case in which the cellular telephone device 1 A is in the second opened state.

As shown in FIG. 11, the loop antenna 100 forms a loop in a case in which the cellular telephone device 1 A is in the first opened state. In a case in which the cellular telephone device 1 A is in the first opened state, the loop antenna 100 forms a loop, of which center in the longitudinal direction is inwardly concave (narrowed) when viewed from the front in FIG. 9. More specifically, in a case in which the cellular telephone device 1 A is in the first opened state, the coil portion 14 configuring the loop antenna 100 forms a loop, of which center in the longitudinal direction is inwardly concave (narrowed) when viewed from the front in FIG. 9.

When the first opened state shown in FIGS. 8 and 10 transitions to the second opened state by rotating the display unit side body 3 around the rotational axis S such that the display unit side inner face 3A is oriented to the opposite side, the loop antenna 100 enters a state in which a loop is not formed as shown in FIG. 11. More specifically, as a result of the transformation from the first opened state to the second opened state, the second portion 100b of the loop antenna 100 is rotationally moved such that the front and back of the second portion 100b are reversed. As a result, the first extension portions 100d and 100d and the second extension portions 100e and 100e, which are disposed in the connecting portion 4, are twisted, and the contact points 150 enter a state of being separated. In the second opened state, the contacting portion 150a and the contacted portion 150b are in a state of being separated from each other.

In other words, in the first opened state, the loop antenna 100 is in a state in which a loop is formed. In this state, the contacting portion 150a and the contacted portion 150b are disposed in the inwardly concave portion. Furthermore, when the first opened state transitions to the second opened state by rotating the display unit side body 3 around the rotational axis S such that the display unit side inner face 3A is oriented to the opposite side, the inwardly concave portion is twisted, the contacting portion 150a and the contacted portion 150b are separated, and the loop antenna 100 enters the state in which a loop is not formed.

As a result, in the second opened state, the loop antenna 100 is in the state in which a loop is not formed. More specifically, in the second opened state, the coil portion 104 configuring the loop antenna 100 is in the state of not configuring a loop. Moreover, in a case in which the display unit side body 3 is rotated around the rotational axis S such that the display unit side inner face 3A is oriented to the opposite side, the contacting portion 150a and the contacted portion 150b are separated, and the loop antenna 100 enters the state in which a loop is not formed.

As described above, in a case in which the cellular telephone device 1A is in the opened state, by rotating the display unit side body 3 so as to reverse the front and back thereof with regard to the operation unit side body 2, the state of being capable of communicating via the loop antenna 100 can be switched to the state of not being capable of communicating via the loop antenna 100.

In addition, the cellular telephone device 1A is in a state of being capable of communicating via the loop antenna 100 only in the first opened state.

According to the present embodiment, an effect similar to the effect in the aforementioned cellular telephone device 1 can be achieved.

Furthermore, according to the present embodiment, since communication via the loop antenna 100 is possible only in the first opened state, the security is further improved.

Moreover, the structure and configuration of the loop antenna 100, and other forms of type of an external device are similar to those in the cellular telephone device 1.

Next, a description is provided for an embodiment in which the cellular telephone device is of a slider type, with reference to FIGS. 12 to 15.

Figure 12:
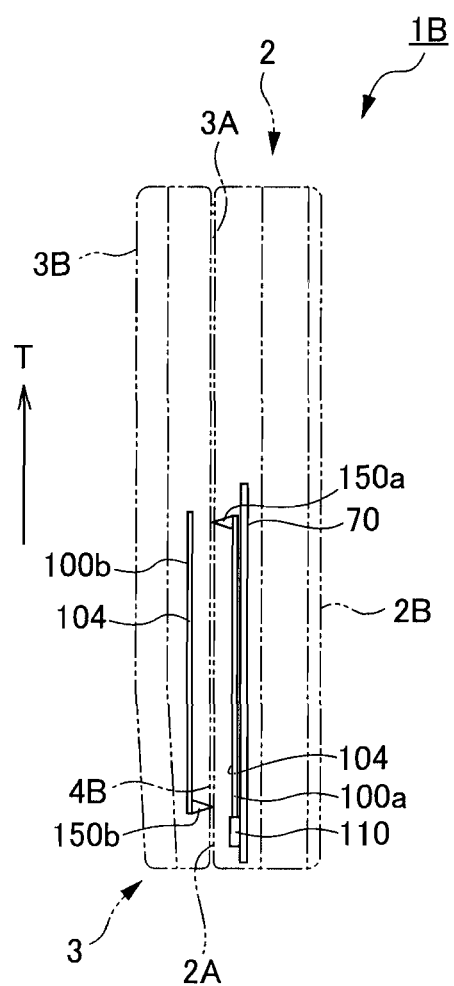
FIG. 12 is a side view of a cellular telephone device 1B in a closed state.
Figure 13:
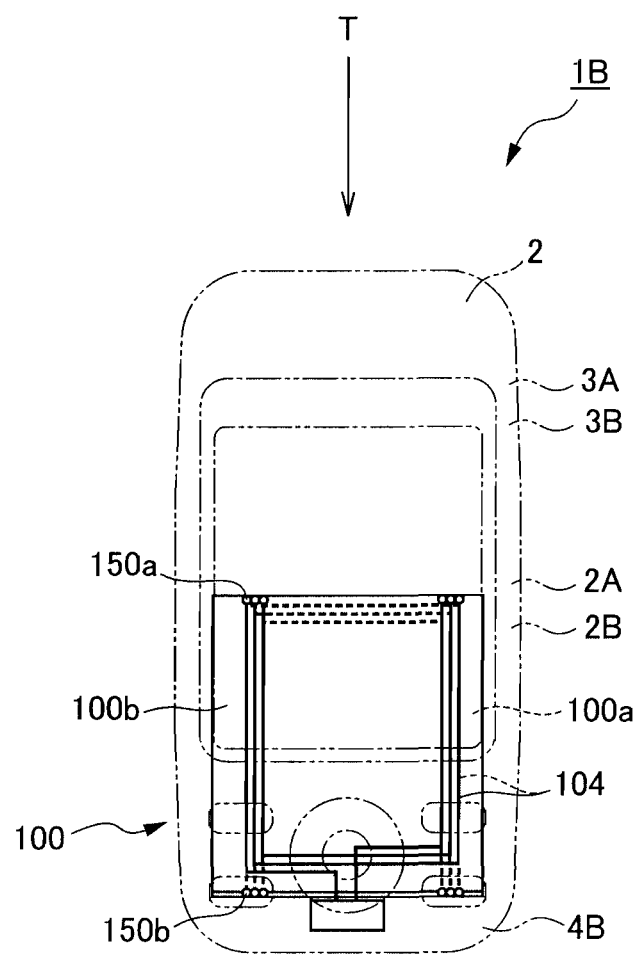
FIG. 13 is a diagram illustrating an arrangement and a state of the loop antenna 100 in the closed state.
Figure 14:
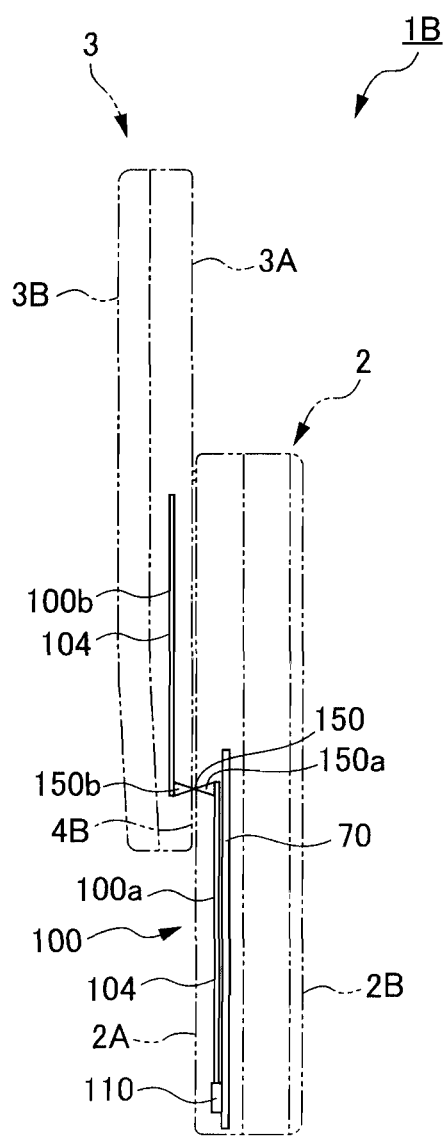
FIG. 14 is a side view of the cellular telephone device 1B in the opened state.
Figure 15:
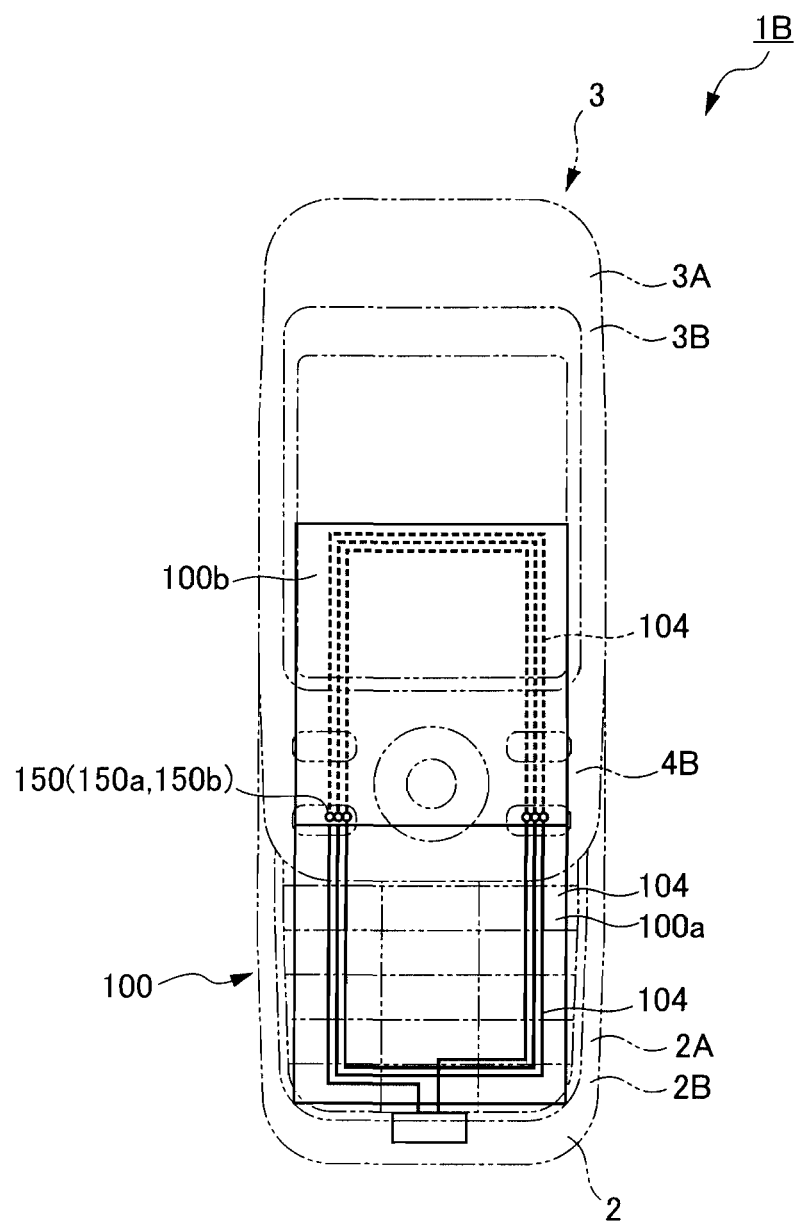
FIG. 15 is a diagram illustrating an arrangement and a state of the loop antenna 100 in the opened state.

FIG. 12 is a side view of a cellular telephone device 1B in a closed state. FIG. 13 is a diagram illustrating an arrangement and a state of the loop antenna 100 in the closed state. FIG. 14 is a side view of the cellular telephone device 1B in an opened state. FIG. 15 is a diagram illustrating an arrangement and a state of the loop antenna 100 in the opened state.

In the following, descriptions of configurations similar to those of the aforementioned cellular telephone device 1 (the opening-and-closing type) are omitted, and different configurations are mainly described.

As shown in FIGS. 12 to 15, the cellular telephone device 1B includes the operation unit side body 2 and the display unit side body 3 that is disposed so as to be superimposed on the operation unit side inner face 2A side of the operation unit side body 2. The display unit side body 3 is connected with the operation unit side body 2 so as to be slidably moved over the operation unit side inner face 2A.

The cellular telephone device 1B includes a connecting portion 4B that connects the operation unit side body 2 and the display unit side body 3 such that the operation unit side body 2 and the display unit side body 3 slidably move with regard to each other. The connecting portion 4B connects the operation unit side body 2 and the display unit side body 3 such that the cellular telephone device 1B is transformable into an opened state and a closed state.

More specifically, the connecting portion 4B connects the operation unit side body 2 and the display unit side body 3 so as to be slidably moved, such that the cellular telephone device 1B is transformable into: an opened state (see FIGS. 14 and 15) in which the display unit side body 3 is disposed in an opened position as a first relative position with regard to the operation unit side body 2, and a predetermined area of the operation unit side inner face 2A is exposed to the outside; and a closed state (see FIGS. 12 and 13) in which the display unit side body 3 is disposed in a closed position as a second relative position with regard to the operation unit side body 2, so as to cover the predetermined area of the operation unit side inner face 2A.

As shown in FIGS. 12 to 15, the loop antenna 100 includes the sheet portion 102 and the coil portion 104 disposed on the sheet portion 102. The loop antenna 100 includes the first portion 100a disposed inside the operation unit side body 2, and the second portion 100b disposed inside the display unit side body 3.

The coil portion 104 includes the contact points 150. More specifically, the coil portion 104 includes the contact points 150 that are coupled with each other in a case in which the cellular telephone device 1 B is in the opened state, and are separated from each other in a case in which the cellular telephone device 1 B is in the closed state.

The contact points 150 have the contacting portion 150a disposed on the first portion 100a side, and the contacted portion 150b disposed on the second portion 100b side. The contacting portion 150a and the contacted portion 150b are coupled (connected) with each other in a case in which the cellular telephone device 1 B is in the opened state, and are separated from each other in a case in which the cellular telephone device 1 B is in the closed state. More specifically, the contacting portion 150a and the contacted portion 150b are separated from each other in the sliding direction in the closed state, and are in a state of abutting on (electrically connected with) each other in the opened state.

As shown in FIG. 13, the loop antenna 100 does not form a loop in a case in which the cellular telephone device 1B is in the closed state. More specifically, in a case in which the cellular telephone device 1B is in the closed state, the contact points 150 are in the state of being separated, and thus the loop antenna 100 does not form a loop. More specifically, in a case in which the cellular telephone device 1B is in the closed state, the contacting portion 150a and the contacted portion 150b are in the state of being separated, and thus the loop antenna 100 does not form a loop. The first portion 100a and the second portion 100b are disposed so as to be mutually superimposed in a direction in which they are superimposed.

When the closed state shown in FIGS. 12 and 13 transitions to the opened state by slidably moving the display unit side body 3 in a direction of an arrow T, the loop antenna 100 enters a state in which a loop is formed as shown in FIGS. 14 and 15. More specifically, in a case in which the cellular telephone device 1B is in the opened state, the contact points 150 are in the state of being connected, and thus the loop antenna 100 forms a loop. More specifically, in a case in which the cellular telephone device 1B is in the opened state, the contacting portion 150a and the contacted portion 150b are in the state of being connected, and thus the loop antenna 100 forms a loop.

The loop antenna 100 forms a loop when viewed from the front in FIG. 15. More specifically, in a case in which the cellular telephone device 1B is in the opened state, the coil portion 104 configuring the loop antenna 100 forms an annular loop when viewed from the front in FIG. 15.

According to the present embodiment, an effect similar to the effect in the aforementioned cellular telephone device 1 can be achieved.

Moreover, in the present embodiment, the loop antenna 100 is configured such that the contacting portion 150a and the contacted portion 150b are connected so as to form a loop in a case in which the cellular telephone device 1 B is in the opened state, and the contacting portion 150a and the contacted portion 150b are separated so as not to form a loop in a case in which the cellular telephone device 1 B is in the closed state; however, it is not limited thereto. The loop antenna 100 may be configured such that the contacting portion 150a and the contacted portion 150b are connected so as to form a loop in a case in which the cellular telephone device 1 B is in the closed state, and the contacting portion 150a and the contacted portion 150b are separated so as not to form a loop in a case in which the cellular telephone device 1 B is in the opened state.

Moreover, the structure and configuration of the loop antenna 100, and other forms of type of an external device are similar to those in the cellular telephone device 1.

Subsequently, a description is provided for an embodiment in which the cellular telephone device is of a cycloid type, with reference to FIGS. 16 to 18.

Figure 16:
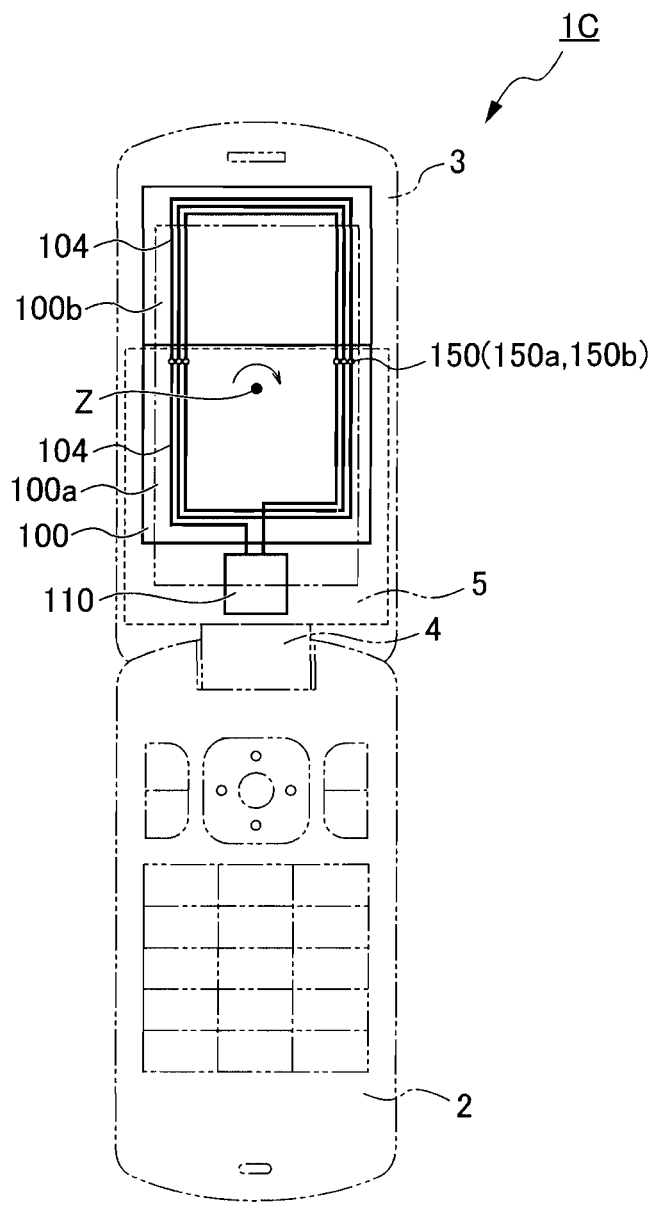
FIG. 16 is a diagram illustrating an arrangement and a state of the loop antenna 100 in a first state.

FIG. 16 is a diagram illustrating an arrangement and a state of the loop antenna 100 in a first state. FIG. 17 is a side view of a cellular telephone device 1C in the first state. FIG. 18 is a diagram illustrating an arrangement and a state of the loop antenna 100 in a second state.

The cellular telephone device 1C includes: the operation unit side body 2; a support member 6 as a first body having an inner face 6A as a first face; the display unit side body 3 as a second body that is disposed so as to be superimposed on the inner face 6A side of the support member 6; and a connecting portion 7 that connects the display unit side body 3 and the support member 6 so as to be relatively rotatable around a rotational axis Z that perpendicularly intersects the inner face 6A.

The connecting portion 7 includes the rotational axis Z, and connects the display unit side body 3 and the support member 6 so as to be relatively rotatable around the rotational axis Z, such that the cellular telephone device 1C is transformable into: a first state (see FIGS. 16 and 17) in which the display unit side body 3 is disposed in a first relative position with regard to the support member 6; and a second state (see FIG. 18) in which the display unit side body 3 is disposed in a second relative position, which is different from the first relative position, with regard to the support member 6.

Figure 17:
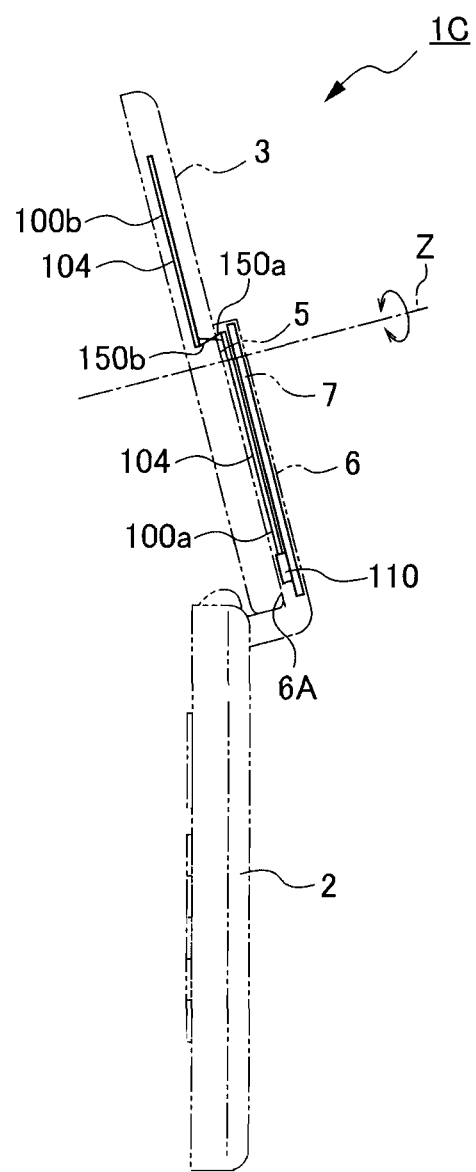
FIG. 17 is a side view of a cellular telephone device 1C in the first state.
Figure 18:
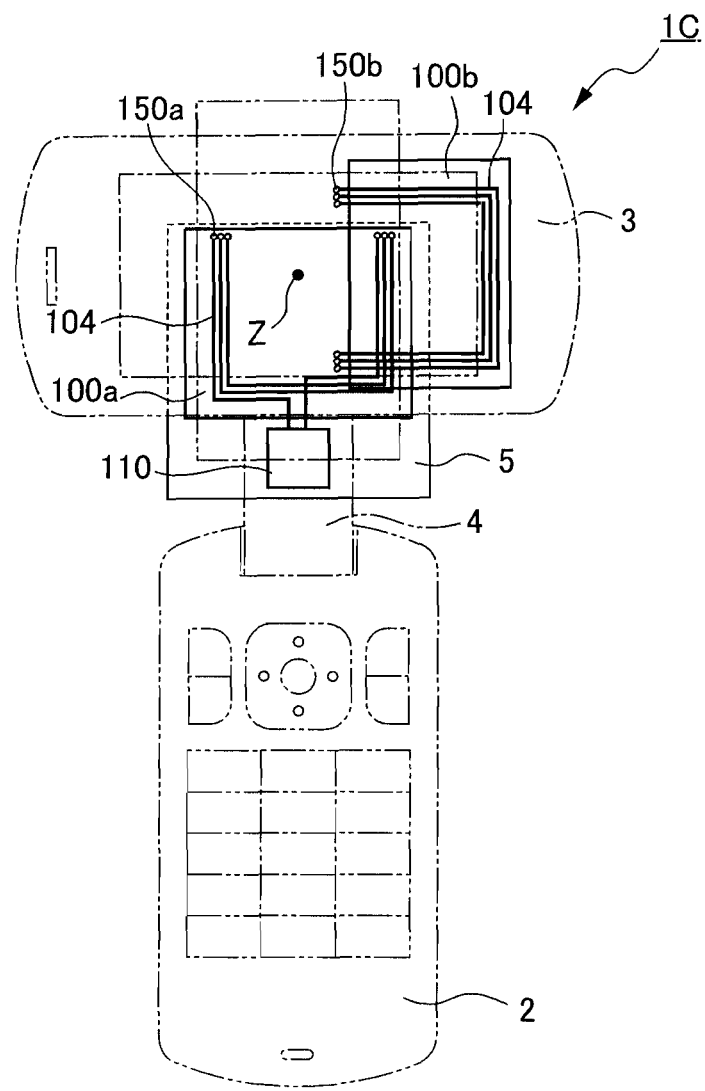
FIG. 18 is a diagram illustrating an arrangement and a state of the loop antenna 100 in a second state.

As shown in FIGS. 16 to 18, the loop antenna 100 includes the sheet portion 102 and the coil portion 104 disposed on the sheet portion 102. The loop antenna 100 includes the first portion 100a disposed inside the support member 6, and the second portion 100b disposed inside the display unit side body 3.

The coil portion 104 includes the contact points 150. More specifically, the coil portion 104 includes the contact points 150 that are coupled (connected) with each other in a case in which the cellular telephone device 1 C is in the first state, and are separated from each other in a case in which the cellular telephone device 1 C is in the second state.

The contact points 150 have the contacting portion 150a disposed on the first portion 100a side, and the contacted portion 150b disposed on the second portion 100b side. The contacting portion 150a and the contacted portion 150b are coupled (connected) with each other in a case in which the cellular telephone device 1 C is in the first state, and are separated from each other in a case in which the cellular telephone device 1 C is in the second state.

As shown in FIG. 16, the loop antenna 100 forms a loop in a case in which the cellular telephone device 1C is in the first state. More specifically, in a case in which the cellular telephone device 1C is in the first state, the contact points 150 are in the state of being connected, and thus the loop antenna 100 forms a loop. More specifically, in a case in which the cellular telephone device 1C is in the first state, the contacting portion 150a and the contacted portion 150b are in the state of being connected, and thus the loop antenna 100 forms a loop.

The loop antenna 100 forms a loop when viewed from the front in FIG. 16. More specifically, in a case in which the cellular telephone device 1C is in the first state, the coil portion 104 configuring the loop antenna 100 forms a loop when viewed from the front in FIG. 16.

When the first state shown in FIGS. 16 and 17 transitions to the second state by rotatably moving the display unit side body 3 around the rotational axis Z in a direction of an arrow, the loop antenna 100 enters a state in which a loop is not formed as shown in FIG. 18.

More specifically, in a case in which the cellular telephone device 1C is in the second state, the contact points 150 are in the state of being separated, and thus the loop antenna 100 does not form a loop. More specifically, in a case in which the cellular telephone device 1C is in the second state, the contacting portion 150a and the contacted portion 150b are in the state of being separated, and thus the loop antenna 100 does not form a loop.

According to the present embodiment, an effect similar to the effect in the aforementioned cellular telephone device 1 can be achieved.

Moreover, in the present embodiment, the loop antenna 100 is configured such that the contacting portion 150a and the contacted portion 150b are connected so as to form a loop in a case in which the cellular telephone device 1C is in the first state, and the contacting portion 150a and the contacted portion 150b are separated so as not to form a loop in a case in which the cellular telephone device 1C is in the second state; however, it is not limited thereto. The loop antenna 100 may be configured such that the contacting portion 150a and the contacted portion 150b are connected so as to form a loop in a case in which the cellular telephone device 1C is in the second state, and the contacting portion 150a and the contacted portion 150b are separated so as not to form a loop in a case in which the cellular telephone device 1C is in the first state.

Moreover, the structure and configuration of the loop antenna 100, and other forms of type of an external device are similar to those in the cellular telephone device 1.

The invention claimed is:

1. A portable electronic device, comprising:
a first body;
a second body;
a connecting portion that connects the first body and the second body, of which relative positions can be changed, so as to be transformable into a first state and a second state; and
an antenna that is disposed in the first body and the second body, the antenna including:
a first portion, at least a part of which is disposed on a side of the first body;
a second portion, at least a part of which is disposed on a side of the second body;
a contacting portion that is disposed on a side of the first portion; and
a contacted portion that is disposed on a side of the second portion,
wherein the antenna forms a loop by way of the contacting portion and the contacted portion being connected in the first state,
wherein the antenna does not form a loop by way of the contacting portion and the contacted portion being separated in the second state,
wherein communication with an external device via the antenna is enabled when the antenna forms the loop, and
wherein communication with an external device via the antenna is disabled when the antenna does not form the loop.

2. A portable electronic device, comprising:
a first body including a first face;
a second body including a second face;
a connecting portion that connects the first body and the second body so as to be openable and closable around an opening-and-closing axis, and deformable into an opened state in which the first face and the second face are disposed to be separated from each other, and a closed state in which the first face and the second face are disposed to be superimposed in a state of being adjacent to each other; and
an antenna that is disposed in the first body and the second body, the antenna including:
a first portion, at least a part of which is disposed on a side of the first body;
a second portion, at least a part of which is disposed on a side of the second body;
a contacting portion that is disposed on a side of the first portion; and
a contacted portion that is disposed on a side of the second portion,
wherein the antenna forms a loop by way of the contacting portion and the contacted portion being connected in the opened state,
wherein the antenna does not form a loop by way of the contacting portion and the contacted portion being separated in the closed state,
wherein communication with an external device via the antenna is enabled when the antenna forms the loop, and
wherein communication with an external device via the antenna is disabled when the antenna does not form the loop.

3. The portable electronic device according to claim 2,
wherein the first portion of the antenna is disposed on a side of a third face that is opposite to the first face of the first body, and
wherein the second portion of the antenna is disposed on a side of a fourth face that is opposite to the second face of the second body.

4. The portable electronic device according to claim 2,
wherein the first portion has a first extension portion disposed on a side of the connecting portion,
wherein the second portion has a second extension portion disposed on a side of the connecting portion,
wherein the contacting portion is disposed in the first extension portion,
wherein the contacted portion is disposed in the second extension portion, and
wherein the contacting portion and the contacted portion are connected with each other in a vicinity of the connecting portion or the connecting portion in the opened state.

5. The portable electronic device according to claim 2,
wherein the antenna is formed in an annular shape extending in a plane in a state in which a loop is formed.

6. The portable electronic device according to claim 2,
wherein the connecting portion connects the first body and the second body such that the second body is rotatable with regard to the first body around a rotational axis that intersects the opening-and-closing axis, and
wherein the antenna is formed in an annular shape, of which center in a longitudinal direction of the portable electronic device is inwardly concave, in a first opened state that is the opened state in which the first face and the second face are oriented to a same side.

7. The portable electronic device according to claim 6,
wherein the contacting portion and the contacted portion of the antenna are disposed in an inwardly concave portion in the first opened state, and
wherein, when the first opened state transitions to a second opened state in which the first face and the second face are oriented to opposite sides by rotating the second body around the rotational axis such that the second face is oriented to an opposite side, then the inwardly concave portion is twisted, the contacting portion and the contacted portion are separated, and the antenna enters a state in which a loop is not formed.

8. A portable electronic device, comprising:
a first body including a first face;
a second body that is disposed so as to be superimposed on a side of the first face of the first body;
a connecting portion that connects the first body and the second body so as to be slidably moved and to be transformable into an opened state in which a predetermined area of the first face is externally exposed, and a closed state in which the predetermined area is covered; and
an antenna that is disposed in the first body and the second body, the antenna including:
a first portion, at least a part of which is disposed on a side of the first body;
a second portion, at least a part of which is disposed on a side of the second body;
a contacting portion that is disposed on a side of the first portion; and
a contacted portion that is disposed on a side of the second portion,
wherein the antenna forms a loop by way of the contacting portion and the contacted portion being connected in one of the opened state or the closed state, wherein the antenna does not form a loop by way of the contacting portion and the contacted portion being separated in another one of the opened state or the closed state wherein communication with an external device via the antenna is enabled when the antenna forms the loop, and wherein communication with an external device via the antenna is disabled when the antenna does not form the loop.

9. The portable electronic device according to claim 8, wherein the antenna does not form a loop by way of the contacting portion and the contacted portion being separated in the closed state, wherein the first portion and the second portion are disposed so as to be mutually superimposed in a direction in which the first body and the second body are superimposed.

10. A portable electronic device, comprising:

a first body including a first face;

a second body that is disposed so as to be superimposed on a side of the first face of the first body;

a connecting portion that includes a rotational axis extending in a direction intersecting the first face of the first body, and connects the first body and the second body so as to be relatively rotatable around the rotational axis and deformable into a first state and a second state; and an antenna that is disposed in the first body and the second body, the antenna including:

a first portion, at least a part of which is disposed on a side of the first body;

a second portion, at least a part of which is disposed on a side of the second body;

a contacting portion that is disposed on a side of the first portion; and a contacted portion that is disposed on a side of the second portion, wherein the antenna forms a loop by way of the contacting portion and the contacted portion being connected in one of the first state or the second state, wherein the antenna does not form a loop by way of the contacting portion and the contacted portion being separated in another one of the first state or the second state wherein communication with an external device via the antenna is enabled when the antenna forms the loop, and wherein communication with an external device via the antenna is disabled when the antenna does not form the loop.

\* \* \* \* \*